Patented May 22, 1945

2,376,434

UNITED STATES PATENT OFFICE 2,376,434

MANUFACTURE OF SODIUM HYDROSULPHIDES

Charles Louis Koenig, Syracuse, N. Y., assignor to The Solvay Process Company, New York, N. Y., a corporation of New York No Drawing. Application March 18, 1944,
Serial No. 527,143

11 Claims. (Cl. 23—134)

This invention relates to manufacture of sodium hydrosulphide (NaHS) or sodium sulphide ($Na_2S$) or mixtures of both.

With the exception of a very small amount, all commercial grades of sodium sulphide are made from salt cake ($Na_2SO_4$) or nitre cake ($NaHSO_4$) by reduction with coal or coke at elevated temperatures. The reaction is usually carried out in reverberatory or rotary furnaces, and the furnaced material is put thru a relatively elaborate and cumbersome $Na_2S$ recovery and purification procedure. Such process is inherently complicated and costly, and moreover results in an end product containing a substantial quantity of impurities, particularly iron. Sodium hydrosulphide may be formed by gassing sodium sulphide liquor with hydrogen sulphide. Also, sodium sulphide may be made by treating an NaHS liquor with sodium hydroxide.

It is known that sodium carbonate ($Na_2CO_3$) reacts with $H_2S$ to form NaHS. Attempts have been made to produce NaHS by gassing a liquor containing sodium carbonate with hydrogen sulphide. While these proposals bring about formation of some NaHS which remains in solution, it was observed that the proportion of the sodium content of the liquor subjected to gassing which precipitated as sodium acid carbonate (mostly $Na_2CO_3.NaHCO_3.2H_2O$ and $NaHCO_3$) was so great and the loss of sodium as precipitate was so high as to render processes of such nature uneconomical. My investigations indicate the foregoing difficulties are attributable to lack of knowledge of conditions under which the $H_2S$ gassing operation should be carried out. As far as I know, there is no commercial production of sodium hydrosulphide or sodium sulphide by reaction of sodium carbonate and hydrogen sulphide.

A major object of this invention lies in provision of a process for making sodium hydrosulphide or sodium sulphide, of purity acceptable to the trade, using as raw materials commercial grades of soda ash ($Na_2CO_3$) and impure hydrogen sulphide gases which are readily available commercially. Practice of the invention involves gassing an aqueous solution containing sodium carbonate with an $H_2S$ gas to effect reaction of $Na_2CO_3$ and $H_2S$ to form NaHS. From an operating standpoint, a chief object of the invention is provision of processes the practice of which makes it possible to carry out the sodium carbonate liquor-$H_2S$ gassing operation in such a way as to prevent formation of carbonate containing solid phase which not only plugs up the more usual types of gas contacting apparatus but also causes heavy loss of sodium as a sodium acid carbonate of one kind or another. Other important objects are to provide procedures by which (1) decomposition of sodium acid carbonate necessarily formed during $H_2S$ gassing may be effected to such an extent that the amount of sodium acid carbonate carried in solution in the liquors in the system is held at an economical low level, and (2) good conversion of $Na_2CO_3$ to NaHS may be obtained. Further purpose of the invention is to afford accomplishment of the foregoing objects and at the same time utilize, as a source of $H_2S$, commercial hydrogen sulphide gases, e. g. from petroleum refining operations, containing substantial amounts of carbon dioxide the presence of which normally tends to increase formation of sodium acid carbonate.

While it is evident to me that sodium acid carbonates, which tend to separate out in solid phase from liquors such as handled in the invention process, include sodium sesquicarbonate, $Na_2CO_3.NaHCO_3.2H_2O$, and decimite, $$Na_2CO_3.3NaHCO_3$$

as well as a major amount of sodium bicarbonate itself, unless otherwise specified, mention of sodium bicarbonate herein is intended for convenience to include all sodium acid carbonates present.

The process of the invention comprises two major stages: first, formation of aqueous sodium carbonate starting liquors of certain compositions, utilizing commercial soda ash as the raw material; and second, a reaction stage in which the sodium carbonate liquor is contacted under certain conditions with hydrogen sulphide gas to convert $Na_2CO_3$ to NaHS.

I have discovered that a dependent relationship—between (1) the particular composition of the aqueous sodium carbonate starting liquor and (2) the temperature and conditions of pressure at which $H_2S$ gassing is carried out—prevents during the gassing operation formation of carbonate containing solid phase; and hastens decomposition of sodium acid carbonate formed during the process and thus minimizes the amount of sodium acid carbonate retained in the product solutions to such an extent as to render the process economical.

I find that the aqueous carbonate of sodium starting liquor should have in solution a "total sodium salt content" of not more than 21% by weight, expressed as $Na_2CO_3$. In this specification and appended claims, the expression "total sodium salt content" is used to define the sum of any or all of the sodium salts of the group consisting of the carbonate, bicarbonate, bisulphide, and sulphide of sodium. The preferred starting solution is an aqueous $Na_2CO_3$ solution containing substantially no sodium salt other than $Na_2CO_3$ and having an $Na_2CO_3$ concentration of not less than 10% and not more than 21% by weight. Such a solution may be made up by adding the proper amount of commercial soda ash to water. The starting solution may contain some NaHS, some sodium acid carbonate, possibly some Na₂S, or some of any two or all three, but preferably the sodium salt present should be predominantly $Na_2CO_3$ as such, and in any case the "total sodium salt content" should not exceed 21% by weight expressed as $Na_2CO_3$. The starting solutions employed should contain desirably at least 10% by weight of $Na_2CO_3$ and be preferably as concentrated as possible, and usually are water solutions of sodium carbonate having $Na_2CO_3$ concentrations of 18-20% by weight.

A second control factor of importance is the temperature at which gassing of the sodium carbonate solution with $H_2S$ is carried out. In the course of $H_2S$ gassing, $Na_2CO_3$ reacts with $H_2S$ to produce NaHS and $NaHCO_3$. At certain temperature conditions, much of the $NaHCO_3$ formed may be broken down by heat to $CO_2$, water and $Na_2CO_3$, and such $Na_2CO_3$ is made available for reaction with further $H_2S$ to make more NaHS. I have found, in conjunction with utilization of the above described starting liquors, that in order to enhance reaction of $H_2S$ and sodium carbonate, to prevent formation of carbonate containing solid phase, to hasten decomposition of sodium acid carbonate and effect stripping out and discharge from the contacting zone of $CO_2$ initially combined with $Na_2CO_3$ and thus minimize the quantity of sodium acid carbonate held in solution in the liquor in the contacting zone, the sodium carbonate-$H_2S$ gassing operation should be carried out while maintaining, in the contacting zone, temperature not less than 100° C. and not more than 125° C. Preferred operating temperatures are in the range of 105-115° C., and very good results have been obtained when reaction zone temperature is held at about 106-108° C. Temperatures not less than 100° C. are needed to prevent precipitation of solid-phase sodium carbonate, and speed up decomposition of sodium acid carbonate. While temperatures above 125° C. may be used, higher temperatures are not preferred because of greatly increased equipment corrosion.

A third control condition of importance during $H_2S$ gassing is regulating the contacting operation so as to prevent, during the course thereof, increase of "total sodium salt content" of the solution to more than 21% by weight, expressed as $Na_2CO_3$, since higher "total sodium salt content" should be avoided to prevent formation of carbonate containing solid phase. Such regulation of the contacting operation is dependent upon the "total sodium salt content" of the particular starting solution used, and also upon the temperature at which any specific gassing operation is being carried out. As previously indicated, starting solutions usually employed are those having a "total sodium salt content" (preferably all $Na_2CO_3$) of the order of 18-20%. It will be seen that, when utilizing starting solutions of this relatively high "total sodium salt content," there is not much latitude for solution concentration during $H_2S$ gassing before a "total sodium salt content" equal to 21% by weight, expressed as $Na_2CO_3$, would be reached. Hence in this case, very little if any solution concentration should be permitted during $H_2S$ gassing, and to provide for this situation, regardless of the particular reaction temperature being used, it is preferred to carry out gassing under pressure conditions such as to prevent any substantial boiling of the solution being gassed. Specific pressure to be used is dependent upon the particular temperature prevailing in the reaction zone. Solutions of the type employed for $H_2S$ gassing in accordance with the present invention have boiling point of the order of 105° C. Thus, if reaction zone temperature is say 100-103° C., it is possible to proceed at atmospheric pressure without losing enough water vapor to cause detrimental total sodium salt concentration. However, preferred reaction temperatures are 105° C. or above, and accordingly it is preferred to subject the solution being gassed to superatmospheric pressure sufficient to prevent any substantial boiling to thus avoid loss of water vapor and corresponding "total sodium salt content" concentration. Pressures up to 30 lbs. gauge may be used, pressures in the preferred temperature range of 105-115° C. being about 5-20 lbs. gauge.

When using starting solutions having "total sodium salt content" substantially less than 21% by weight, expressed as $Na_2CO_3$, it should be understood that appreciable "total sodium salt content" concentration during gassing is permissible without increasing the "total sodium salt content" of the solution to more than 21% by weight, expressed as $Na_2CO_3$. Thus when using relatively weak, say of the order of 15% "total sodium salt content," starting solutions, boiling of the solution undergoing gassing may be permitted until the "total sodium salt content" approaches 21% by weight, expressed as $Na_2CO_3$.

The gassing operation may be carried out in any satisfactory liquor-gas contacting apparatus. The $H_2S$ gas may be bubbled thru a relatively static body of starting liquor. However, it is preferred to effect reaction in a countercurrent tower of suitable design. The tower may be packed, e. g. with suitably sized coke or say 1 inch Raschig rings, or packing may be omitted and the tower preferably provided with baffles arranged to afford good contact of gas and liquor and controllable retarded downflow of liquor. Whatever type of contacting apparatus is employed, it will be understood that construction is such as to include the accessory equipment needed to provide for introduction of the starting liquor into the top of the reaction zone against whatever pressure there may be therein, control of rate of feed of incoming liquor, discharge of reacted liquor, maintenance throughout the contacting zone of the indicated temperatures and whatever pressures may be needed, introduction into the reaction zone of $H_2S$ gas employed, and discharge of tail gas.

Hydrogen sulphide gassing may be carried out in a single tower suitably proportioned as to height and cross-section to permit gas-liquor contact in such a way that satisfactory reaction of sodium carbonate and $H_2S$ may be had during a single pass of liquor thru the tower. In this situation, whether packed or provided with baffles, it will be understood that design of tower, rate of feed of starting liquor, rate of introduction of $H_2S$ gas and rate of withdrawal of reacted liquor are such as to afford adequate retention of liquor in the contacting zone to obtain the desired degree of reaction of $Na_2CO_3$ and $H_2S$. Gassing may be effected in a relatively small tower provided with means to repeatedly recirculate liquor over the tower. Alternatively, a plurality of contacting towers may be employed in which case, it will be understood, the starting liquor is fed into the top of the first tower, partly reacted liquor withdrawn from the bottom and fed into the top of a second tower, and product liquor withdrawn from the bottom of the second tower, if only two towers are used. In such procedure the H₂S gas is introduced into the bottom of the second tower, gas leaving the top of the second tower is fed into the bottom of the first tower and tail gas is discharged from the top. Each tower is provided with the necessary means to keep temperatures and pressures existing in the reaction zone within the limits indicated. Temperatures may be maintained by controlled indirect heating. All contacting operations mentioned may be carried out on a continuous basis, i. e. initial starting liquor and H₂S gas may be continuously introduced into the system and product liquor withdrawn therefrom.

In practice, the gases which may be employed include pure H₂S gas, H₂S gas containing diluents inert to the reaction, or an H₂S gas containing a diluent such as CO₂ which is not inert to the reaction, i. e. CO₂ reacts in water solution with Na₂CO₃ to form NaHCO₃. In the case of H₂S gases containing diluents inert to the reaction, H₂S concentration may be any feasible value. I find that in order to prevent a build-up of NaHCO₃ in the system, particularly in a continuous operation, if the H₂S gas used contains CO₂, such incoming H₂S gas should contain by volume no more CO₂ than H₂S. In all operations, it is preferred to employ gases containing not less than 50% H₂S by volume, and if such gases contain CO₂, concentration of the latter should be not above 25% by volume, i. e. CO₂ content by volume is preferably not more than half the H₂S content by volume. In usual operation, gases utilized comprise about 90% H₂S and about 10% CO₂ by volume. In this specification and appended claims, gas compositions mentioned are intended to define compositions of the H₂S gas at the point of first contact of incoming gas with liquor in the system. I have found when utilizing starting liquors of compositions described and the gassing temperature and pressure conditions noted, operation proceeds smoothly regardless of relatively large amounts of extraneous CO₂ brought into the system with the H₂S gas, this feature being one of the advantages of the invention, namely, utilization of commercially available H₂S gases which contain substantial amounts of CO₂.

In one series of runs using a baffle type tower through which the liquor passed once, a starting liquor consisting of a water solution of soda ash and having an Na₂CO₃ concentration of about 21% by weight, a hydrogen sulphide gas containing about 90% H₂S and 10% CO₂ by volume, reaction zone pressures of about 15 lbs. gauge, the average reaction zone temperatures of the several runs varying from 101° C. to 114° C., there were obtained reacted liquors in which conversions of Na₂CO₃ to NaHS ranged from about 55 to about 62%, and had compositions as follows: NaHS from about 12 to about 14% by weight; NaHCO₃ from about 5 to about 7.5%; Na₂CO₃ from about 3.5% to about 6.5%; and "total sodium salt contents" expressed as Na₂CO₃ varied from 20 to about 22.5%. Carbonate containing solid phase did not form during gassing.

In other representative runs using a packed tower and a single pass of liquor thru the tower, a starting liquor consisting of a 20% by weight soda ash water solution, and a gas comprising 90% H₂S and 10% CO₂ by volume, reaction zone pressure of about 15 lbs. gauge, and reaction zone temperatures of about 104–106° C.; about 44–45% conversion of Na₂CO₃ to NaHS was obtained, and the reacted liquors analyzed by weight, NaHS 9–10%; NaHCO₃ 9–12%; Na₂CO₃ 4–5%; and 20–21% "total sodium salt content" expressed as Na₂CO₃. Carbonate containing solid phase did not form during gassing.

The reacted liquors contain appreciable quantities of sodium acid carbonate and sodium carbonate, Na₂CO₃. Liquors of this type should not be concentrated by the usual evaporation methods in the presence of sodium acid carbonate, without loss of NaHS, since it appears that on heating, sodium acid carbonate causes decomposition of NaHS with resultant formation of Na₂CO₃ and H₂S. Hence, sodium acid carbonate should be removed substantially completely from the reacted liquor in any suitable way. This may be accomplished, for example, by treating effluent liquor of the reaction zone with caustic soda, resulting in conversion of acid sodium carbonate to Na₂CO₃ and water. Following substantial elimination of sodium acid carbonate, the liquor may be concentrated as desired to strength of about 50% NaHS. During such concentration, which may be effected by heating the liquor at atmospheric pressure to about 150° C., most of the Na₂CO₃ precipitates, settles out and may be removed by filtration. The resulting relatively strong NaHS filtrate ordinarily contains in solution about 0.2–0.3% Na₂CO₃ in solution, which residual Na₂CO₃ may be removed in any suitable way if substantially pure NaHS end product is desired. If the end product desired is Na₂S, the NaHS liquor may be treated with NaOH to convert all or any portion of the NaHS to Na₂S. Alternatively, NaHS or Na₂S may be produced in solid form by evaporation of the liquors and solidification by known methods. Na₂CO₃ by-product may be returned to the process.

Two copending applications, of Julien and Terziev, Serial No. 522,794, and Arthur W. Saddington, Serial No. 538,101, both assigned to the same common assignee as this application and both directed to subject matter related to this application, were filed on February 17, 1944 and May 30, 1944, respectively.

I claim:

1. The method for producing sodium hydrosulphide which comprises forming an aqueous carbonate of sodium solution having a "total sodium salt content" of not more than 21% by weight, expressed as Na₂CO₃, said "total sodium salt content" being at least predominantly Na₂CO₃, contacting said solution with gas containing H₂S and an amount of CO₂ ranging from none to a volume equal to the volume of the H₂S content of said gas, and maintaining, during said contacting operation, temperature not less than 100° C. and pressure conditions such as to prevent any substantial boiling of said solution, thereby forming sodium hydrosulphide.

2. The method for producing sodium hydrosulphide which comprises forming an aqueous carbonate of sodium solution containing substantially no sodium salt other than carbonate and having a total carbonate of sodium content not more than 21% by weight, expressed as Na₂CO₃, said carbonate of sodium content being at least predominantly Na₂CO₃, contacting said solution with gas containing H₂S and an amount of CO₂ ranging from none to a volume equal to the volume of the H₂S content of said gas, and maintaining, during said contacting operation, temperature not less than 100° C. and pressure conditions such as to prevent any substantial boiling of said solution, thereby forming sodium hydrosulphide.

3. The method for producing sodium hydrosulphide which comprises forming an aqueous $Na_2CO_3$ solution containing substantially no sodium salt other than $Na_2CO_3$ and having an $Na_2CO_3$ concentration of not more than 21% by weight, contacting said solution with gas containing $H_2S$ and an amount of $CO_2$ ranging from none to a volume equal to the volume of the $H_2S$ content of said gas, and maintaining, during said contacting operation, temperature not less than 100° C. and pressure conditions such as to prevent any substantial boiling of said solution, thereby forming sodium hydrosulphide.

4. The method for producing sodium hydrosulphide which comprises forming an aqueous carbonate of sodium solution having a "total sodium salt content" of not more than 21% by weight, expressed as $Na_2CO_3$, said "total sodium salt content" being at least predominantly $Na_2CO_3$, contacting said solution with gas containing $H_2S$ and an amount of $CO_2$ ranging from none to a volume equal to half the volume of the $H_2S$ content of said gas, and maintaining, during said contacting operation, temperature not less than 100° C. and pressure conditions such as to prevent any substantial boiling of said solution, thereby forming sodium hydrosulphide.

5. The method for producing sodium hydrosulphide which comprises forming an aqueous carbonate of sodium solution having a "total sodium salt content" of not more than 21% by weight, expressed as $Na_2CO_3$, a substantial portion of said "total sodium salt content" being $Na_2CO_3$, contacting said solution with gas containing $H_2S$ and an amount of $CO_2$ ranging from none to a volume equal to the volume of the $H_2S$ content of said gas while maintaining temperature not less than 100° C., and regulating the contacting operation so as to prevent, during the course thereof, increase of the "total sodium salt content" of the solution undergoing $H_2S$ gassing to more than 21% by weight, expressed as $Na_2CO_3$, thereby forming sodium hydrosulphide.

6. The method for producing sodium hydrosulphide which comprises forming an aqueous carbonate of sodium solution having a "total sodium salt content" of not more than 21% by weight, expressed as $Na_2CO_3$, a substantial portion of said "total sodium salt content" being $Na_2CO_3$, contacting said solution with gas containing $H_2S$ and an amount of $CO_2$ ranging from none to a volume equal to half the volume of the $H_2S$ content of said gas while maintaining temperature not less than 100° C., and regulating the contacting operation so as to prevent, during the course thereof, increase of the "total sodium salt content" of the solution undergoing $H_2S$ gassing to more than 21% by weight, expressed as $Na_2CO_3$, thereby forming sodium hydrosulphide.

7. The method for producing sodium hydrosulphide which comprises forming an aqueous carbonate of sodium solution having a "total sodium salt content" of not more than 21% by weight, expressed as $Na_2CO_3$, a substantial portion of said "total sodium salt content" being $Na_2CO_3$, contacting said solution with gas containing $H_2S$ and an amount of $CO_2$ ranging from none to a volume equal to the volume of the $H_2S$ content of said gas, and maintaining, during said contacting operation, temperature not less than 100° C. and not more than 125° C. and pressure conditions such as to prevent any substantial boiling of said solution, thereby forming sodium hydrosulphide.

8. The method for producing sodium hydrosulphide which comprises forming an aqueous carbonate of sodium solution having a "total sodium salt content" not more than 21% by weight, expressed as $Na_2CO_3$, said "total sodium salt content" being at least predominantly $Na_2CO_3$, contacting said solution with gas containing $H_2S$ and an amount of $CO_2$ ranging from none to a volume equal to the volume of the $H_2S$ content of said gas, and maintaining, during said contacting operation, temperature not less than 100° C. and not more than 125° C. and pressure not less than 5 and not more than 30 lbs. gauge but at least sufficient to prevent any substantial boiling of said solution, thereby forming sodium hydrosulphide.

9. The method for producing sodium hydrosulphide which comprises forming an aqueous $Na_2CO_3$ solution containing substantially no sodium salt other than $Na_2CO_3$ and having an $Na_2CO_3$ concentration not less than 10% and not more than 21% by weight, contacting said solution with gas containing not less than 50% $H_2S$ by volume and an amount of $CO_2$ ranging from none to a volume equal to half the volume of the $H_2S$ content of said gas, and maintaining, during said contacting operation, temperature not less than 105° C. and not more than 115° C. and pressure not less than 5 and not more than 20 lbs. gauge but at least sufficient to prevent any substantial boiling of said solution, thereby forming sodium hydrosulphide.

10. The method for producing sodium hydrosulphide which comprises forming an aqueous carbonate of sodium solution having a "total sodium salt content" of not more than 21% by weight, expressed as $Na_2CO_3$, a substantial portion of said "total sodium salt content" being $Na_2CO_3$, introducing said solution into a reaction zone, contacting said solution therein with gas containing $H_2S$ and an amount of $CO_2$ ranging from none to a volume equal to the volume of the $H_2S$ content of said gas while maintaining temperature not less than 100° C. and not more than 125° C., and regulating the contacting operation so as to prevent, during the course thereof, increase of the "total sodium salt content" of the solution undergoing $H_2S$ gassing to more than 21% by weight, expressed as $Na_2CO_3$, thereby forming sodium hydrosulphide.

11. The method for producing sodium hydrosulphide which comprises forming an aqueous $Na_2CO_3$ solution containing substantially no sodium salt other than $Na_2CO_3$ and having an $Na_2CO_3$ concentration not less than 10% and not more than 21% by weight, introducing said solution into a reaction zone, contacting said solution therein with gas containing not less than 50% $H_2S$ by volume and an amount of $CO_2$ ranging from none to a volume equal to half the volume of the $H_2S$ content of said gas, maintaining during said contacting operation temperature not less than 105° C. and not more than 115° C. and regulating the contacting operation so as to prevent, during the course thereof, increase of the "total sodium salt content" of the solution undergoing $H_2S$ gassing to more that 21% by weight, expressed as $Na_2CO_3$, thereby forming sodium hydrosulphide.

CHARLES LOUIS KOENIG.